United States Patent
Joshi et al.

(10) Patent No.: US 10,430,241 B2
(45) Date of Patent: Oct. 1, 2019

(54) SYSTEMS AND METHODS FOR SCALABLE CLOUD COMPUTING BY OPTIMALLY UTILIZING MANAGEMENT CONTROLLER FOR HOST COMPUTE PROCESSING

(71) Applicant: Dell Products L.P., Round Rock, TX (US)

(72) Inventors: Neeraj Joshi, Puducherry (IN); Lucky Pratap Khemani, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 15/497,481

(22) Filed: Apr. 26, 2017

(65) Prior Publication Data
US 2018/0314558 A1    Nov. 1, 2018

(51) Int. Cl.
| | |
|---|---|
| *G06F 9/50* | (2006.01) |
| *G06F 13/16* | (2006.01) |
| *G06F 13/26* | (2006.01) |
| *G06F 9/455* | (2018.01) |

(52) U.S. Cl.
CPC ........ *G06F 9/5011* (2013.01); *G06F 9/45558* (2013.01); *G06F 13/1663* (2013.01); *G06F 13/26* (2013.01); *G06F 2009/45579* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 6,947,987 | B2 * | 9/2005 | Boland | G06F 9/5016 709/226 |
| 6,990,320 | B2 * | 1/2006 | LeCren | G06F 11/2038 370/225 |
| 7,058,780 | B2 * | 6/2006 | Brown | G06F 9/5016 711/170 |
| 7,664,110 | B1 * | 2/2010 | Lovett | H04L 49/351 370/392 |
| 7,996,842 | B2 * | 8/2011 | Savit | G06F 9/505 718/103 |
| 8,706,798 | B1 * | 4/2014 | Suchter | G06F 9/5038 709/202 |
| 2003/0105799 | A1 * | 6/2003 | Khan | G06F 15/7842 709/201 |
| 2003/0120822 | A1 * | 6/2003 | Langrind | H04L 29/1232 709/251 |
| 2009/0106571 | A1 * | 4/2009 | Low | G06F 9/4856 713/310 |

(Continued)

*Primary Examiner* — Michael Sun
(74) *Attorney, Agent, or Firm* — Jackson Walker L.L.P.

(57) ABSTRACT

In accordance with embodiments of the present disclosure, an information handling system comprising my include a host system comprising a host system processor, and a management controller communicatively coupled to the host system processor and configured to provide management of the information handling system via management traffic communicated between the management controller and a network external to the information handling system and allocate hardware processing resources of the management controller in order to provide compute processing support for the host system processor.

21 Claims, 2 Drawing Sheets

(56) References Cited

U.S. PATENT DOCUMENTS

| | | | | |
|---|---|---|---|---|
| 2011/0289417 | A1* | 11/2011 | Schaefer | G06F 11/1458 |
| | | | | 715/735 |
| 2012/0110164 | A1* | 5/2012 | Frey | G06F 9/5077 |
| | | | | 709/224 |
| 2013/0117766 | A1* | 5/2013 | Bax | G06F 9/4405 |
| | | | | 719/323 |
| 2013/0311822 | A1* | 11/2013 | Kotzur | G06F 11/0727 |
| | | | | 714/6.22 |
| 2014/0142725 | A1* | 5/2014 | Boyd | G05B 19/0421 |
| | | | | 700/28 |
| 2017/0357500 | A1* | 12/2017 | Vidyadhara | G06F 13/4081 |
| 2018/0039546 | A1* | 2/2018 | Lambert | G06F 11/0793 |
| 2018/0053004 | A1* | 2/2018 | Rahardjo | G06F 21/74 |

\* cited by examiner

SYSTEMS AND METHODS FOR SCALABLE CLOUD COMPUTING BY OPTIMALLY UTILIZING MANAGEMENT CONTROLLER FOR HOST COMPUTE PROCESSING

TECHNICAL FIELD

The present disclosure relates in general to information handling systems, and more particularly to methods and systems for enabling scalable cloud computing by utilizing a management controller for host compute processing.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Cloud computing is seeing an increase in users. Cloud computing may be broadly defined as a type of computing (often Internet-based) that provides shared information handling system processing resources and data to information handling systems and other devices on demand. It is a model for enabling ubiquitous, on-demand access to a shared pool of configurable information handling system resources (e.g., information handling system networks, servers, storage, applications and services), which can be rapidly provisioned and released, often with minimal management effort. Cloud computing and storage solutions provide users and enterprises with various capabilities to store and process their data in either privately-owned, or third-party data centers that may be located far from the user, ranging in distance from across a city to across the world.

Two of the most important features of cloud computing implementations are scalability and elasticity. Scalability is an ability of a system to increase its workload on its existing hardware resources, while elasticity is the ability of a system to increase its workload on existing hardware resources and additional hardware resources which may be dynamically added on demand. Thus, cloud computing offers users and enterprises the opportunity to scale their computing resources whenever they deem it necessary. This may be done by either increasing or decreasing resources to meet a demand, allowing a user or enterprise to pay only for the resources they are utilizing.

Cloud computing is often highly dependent on a host system processor which utilizes a significant number of processor cycles, which may also lead to slower performance for other applications in the system or degradation of system performance, or lead to increased spending for additional resources.

SUMMARY

In accordance with the teachings of the present disclosure, the disadvantages and problems associated with existing approaches for cloud computing may be reduced or eliminated.

In accordance with embodiments of the present disclosure, an information handling system comprising my include a host system comprising a host system processor, and a management controller communicatively coupled to the host system processor and configured to provide management of the information handling system via management traffic communicated between the management controller and a network external to the information handling system and allocate hardware processing resources of the management controller in order to provide compute processing support for the host system processor.

In accordance with these and other embodiments of the present disclosure, a method may include, in an information handling system comprising a host system having a host system processor and a management controller communicatively coupled to the host system processor and configured to provide management of the information handling system via management traffic communicated between the management controller and a network external to the information handling system, allocating hardware processing resources of the management controller in order to provide compute processing support for the host system processor.

In accordance with these and other embodiments of the present disclosure, a management controller configured to be disposed in an information handling system and communicatively coupled to a host system processor of a host system of the information handling system may be further configured to provide management of the information handling system via management traffic communicated between the management controller and a network external to the information handling system and allocate hardware processing resources of the management controller in order to provide compute processing support for the host system processor.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
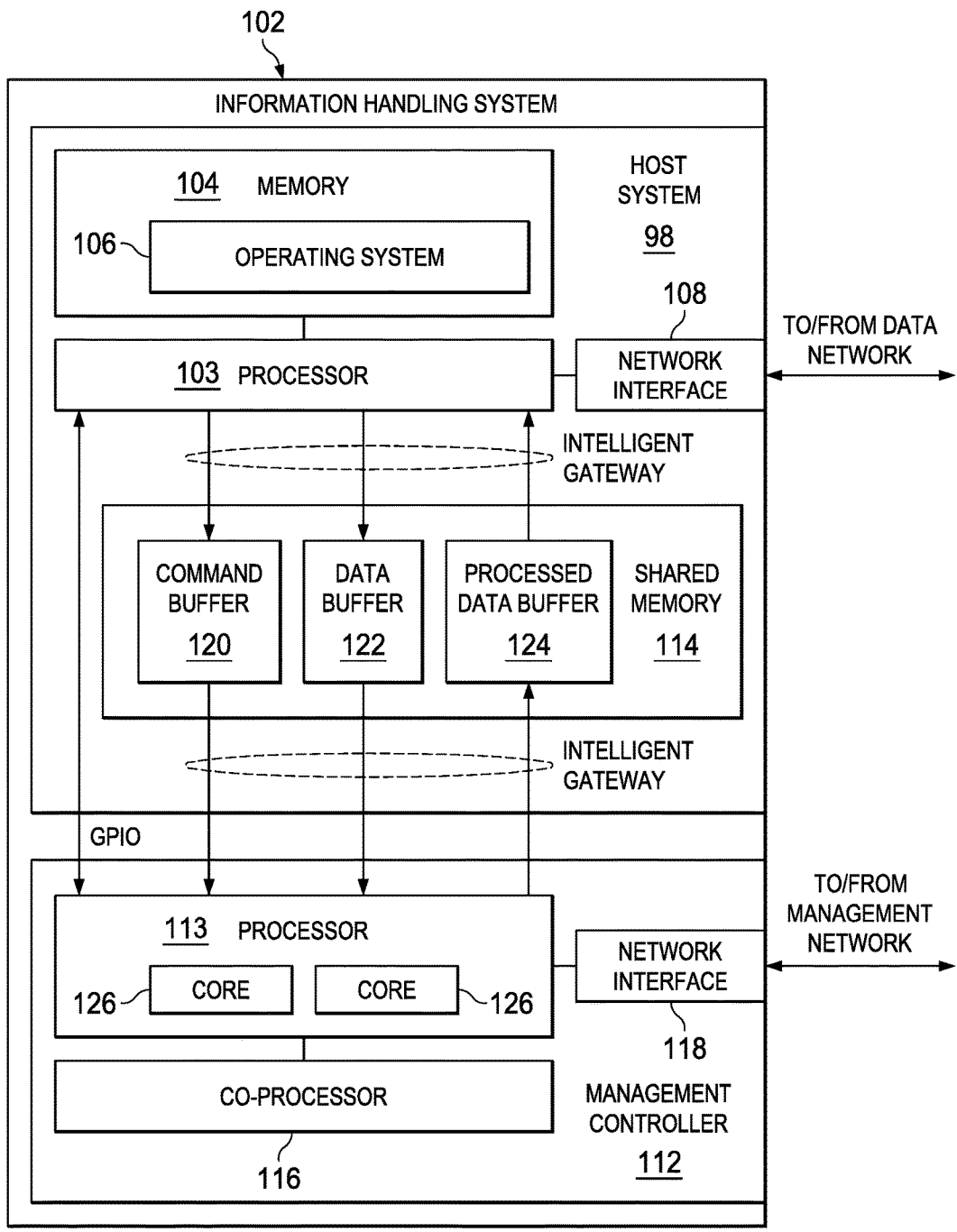
FIG. 1 illustrates a block diagram of an example information handling system, in accordance with embodiments of the present disclosure.
Figure 2:
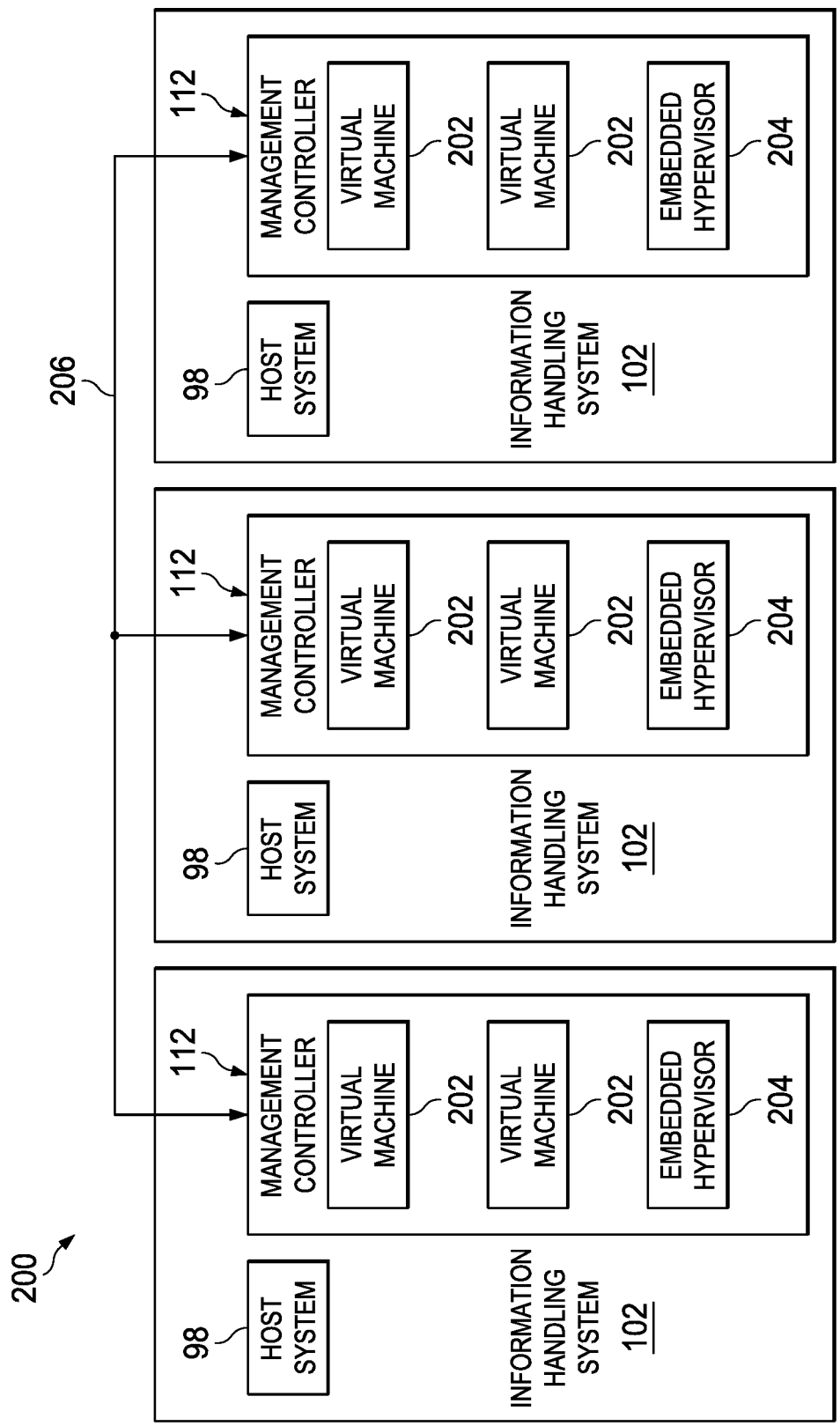
FIG. 2 illustrates a system comprising multiple information handling systems for workload distribution across a pool of management controllers in the system, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a network interface 108 communicatively coupled to processor 103, a management controller 112 communicatively coupled to processor 103, and a shared memory 114 communicatively coupled to processor 103 and management controller 112. In operation, processor 103, memory 104, and network interface 108 may comprise at least a portion of a host system 98 of information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card. In these and other embodiments, processor 103 and network interface 108 may be coupled via any suitable interface, including without limitation a Peripheral Component Interconnect Express (PCIe) bus/interface.

Management controller 112 may be configured to provide management facilities for management of information handling system 102. Such management may be made by management controller 112 even if information handling system 102 is powered off or powered to a standby state. Management controller 112 may include a processor 113, a coprocessor 116 communicatively coupled to processor 113, and a management network interface 118 separate from and physically isolated from data network interface 108. In certain embodiments, management controller 112 may include or may be an integral part of a baseboard management controller (BMC) or a remote access controller (e.g., a Dell Remote Access Controller or Integrated Dell Remote Access Controller). In these and other embodiments, management controller 112 may be referred to as a service processor or access controller.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in computer-readable media of information handling system 102 or management controller 112. As shown in FIG. 1, processor 113 may be communicatively coupled to processor 103. Although such coupling may be via a Universal Serial Bus (USB), System Management Bus (SMBus), and/or one or more other communications channels, communication via a general purpose input/output (GPIO) channel is explicitly depicted in FIG. 1.

As shown in FIG. 1, processor 113 may comprise a multi-core processor comprising a plurality of processing cores 126. Each core 126 may comprise a single independent processing unit configured to read and execute program instructions. The multiple cores 126 may run multiple instructions at the same time, which may increase overall speed for programs amenable to parallel computing by multiple cores. In some embodiments, cores 126 may be integrated onto a single integrated circuit die. In other embodiments, cores 126 may be implemented using multiple dies in a single chip package.

Coprocessor 116 may comprise a special-purpose processor used to supplement functionality of processor 113. For example, in some embodiments, coprocessor 116 may comprise an input/output (I/O) processor for providing I/O operations with respect to other devices. In these and other embodiments, operations performed by coprocessor 116 may include floating point arithmetic, graphics acceleration, signal processing, string processing, and/or encryption. Offloading of specialized tasks from processor 113 to coprocessor 116 may accelerate performance.

Shared memory 114 may be communicatively coupled to processor 113 and management controller 112 and may include any system, device, or apparatus configured to retain program instructions and/or data for a period of time (e.g., computer-readable media). Shared memory 114 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, shared memory 114 may include a command buffer 120, data buffer 122, and a processed data buffer 124. Command buffer 120 may comprise a portion of shared memory 114 for storing commands or instructions communicated from processor 103 for retrieval and execution by management controller 112. Data buffer 122 may comprise a portion of shared memory 114 for storing data communicated from processor 103 for retrieval and use by management controller 112 in executing commands and instructions communicated from processor 113. Processed data buffer 124 may comprise a portion of shared memory 114 for storing data communicated from management controller 112 for retrieval and use by processor 112, wherein such data stored to processed data buffer 124 may be data generated by management controller 112 in connection with commands and instructions communicated from processor 113.

Although the foregoing contemplates use of shared memory 114 to facilitate communication between host system 98 and management controller 112, in some embodiments, techniques other than traditional shared memory communication may be employed for communication between host system 98 and management controller 112 via shared memory 114. For example, in some embodiments, an intelligent gateway may execute as a utility on operating system 106 of host system 98. Using such an intelligent gateway, commands and data communicated via shared memory 114 may include specific headers and/or payloads for dynamically switching among the various modes for compute processing of by management processor 112, as such modes are described below.

In operation, as described in greater detail below, management controller 112 may operate in a plurality of support modes for use as a supplementary compute processor to host system processor 103. When operating in a mode in which management controller 112 supports supplementary compute processing of processor 103, processor 103 may issue commands to management controller 112 by writing commands to command buffer 120 and data associated with such command to data buffer 122, and issuing an interrupt to management controller 112 (e.g., via the GPIO bus shown in FIG. 1). In response to receiving the interrupt, management controller 112 may retrieve commands from command buffer 120 and associated data from data buffer 122, and execute the instructions on one or more cores 126 and/or coprocessor 116. After completing a command, management controller 112 may write any resulting data to processed data buffer 124 and issue an interrupt to processor 103. In response to receiving the interrupt, processor 103 may retrieve data from data buffer 124, and perform any other additional processing required.

As mentioned above, management controller 112 may operate at any given time in one or a plurality of compute support modes. For instance, in a full server management mode, all management features of management controller 112 may be enabled and management controller 112 may not provide any compute support for processor 103. As another example, in a dual mode, some management features of management controller 112 may be enabled and management controller 112 may provide some compute support for processor 103. As a further example, in a full compute support mode, only an absolute minimum of management features of management controller 112 may be enabled and management controller 112 may provide a maximum level of compute support for processor 103.

In some embodiments, management controller 112 may have multiple dual modes. For example, in a first dual mode, priority may be given to compute processing support of processor 103 such that only a small amount of management features of management controller 112 may be enabled and management controller 112 may provide a high level of compute support for processor 103. For instance, in such a first dual mode, cores 126 and coprocessor 116 of management controller 112 may be mainly allocated to compute processing support of processor 103 while only a small number of management features of management controller 112 are carried out with a small process or thread executing on processor 113.

As another example, in a second dual mode, equal priority may be given to management features of management controller 112 and compute support for processor 103. For instance, in such a second dual mode, one core 126 may be allocated to management features of management controller 112 while another core 126 and coprocessor 116 may be allocated to compute processing support of processor 103.

As a further example, in a third dual mode, priority may be given to management features of management controller 112 such that only a small portion of the compute resources of management controller 112 are allocated to compute support for processor 103, and a large portion of the management features are enabled.

In operation, management controller 112 may also be switched among modes responsive to processing demands of information handling system 102, such that higher priority is given by management controller 112 to compute processing support of processor 103 for higher processing demands, and lower priority is given by management controller 112 to compute processing support of processor 103 for lower processing demands.

FIG. 2 illustrates system 200 comprising multiple information handling systems 102 for workload distribution across a pool of management controllers 112 in system 200, in accordance with embodiments of the present disclosure. In FIG. 2, an inter-management controller network 206 (e.g., implemented in Ethernet or any other suitable interface) may couple management controllers 112 of system 200 to one another. Accordingly, the compute processing support described above with respect to FIG. 1 may be extended such that compute support processing for a single host system 98 may be distributed among all management controllers 112 of coupled information handling systems 102. To enable such distributed compute support processing, an embedded hypervisor 204 may execute on each management controller 112 (e.g., on processor 113), each embedded hypervisor 204 managing one or more virtual machines 202 (e.g., also executing on processor 113), wherein each virtual machine 202 carries out compute processing support for a host system 98 local to the information handling system 102 on which the virtual machine 202 is instantiated, or for a host system 98 remote to the information handling system 102 on which the virtual machine 202 is instantiated.

Advantageously, the solutions described herein may provide efficient utilization of cloud server without increasing hardware requirement of an existing cloud, instead using an individual management controller or a group of management controllers as additional compute resources dynamically depending upon a workload.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a host system comprising a host system processor;
a management controller communicatively coupled to the host system processor; and
a shared memory communicatively coupled to both the host system processor and the management controller;
wherein the management controller is configured to:
provide management of the information handling system via management traffic communicated between the management controller and a management network external to the information handling system and isolated from a data network coupled to the information handling system when the host system is in a powered-on state and also when the host system is in a powered-off state; and
allocate hardware processing resources of the management controller to provide compute processing support for the host system processor, such that data associated with the compute processing is stored in the shared memory and is configured to be operated on by both the host system processor and the hardware processing resources of the management controller.

2. The information handling system of claim 1, wherein the management controller is further configured to operate in a plurality of compute processing support modes, wherein each mode defines a priority of allocation of the hardware processing resources of the management controller between compute processing support for the host system processor and execution of management features of the management controller.

3. The information handling system of claim 2, wherein the plurality of compute processing support modes includes at least two of the following modes:
a full server management mode in which all hardware processing resources of the management controller are allocated to execution of management features of the management controller;
a dual mode in which a first portion of hardware processing resources of the management controller are allocated to execution of management features of the management controller and a second portion of hardware processing resources of the management controller are allocated to compute processing support of the host system processor; and a full compute support mode in which all hardware processing resources of the management controller are allocated to compute processing support of the host system processor.

4. The information handling system of claim 2, wherein the plurality of compute processing support modes includes one or more dual modes in which a first portion of hardware processing resources of the management controller is allocated to execution of management features of the management controller and a second portion of hardware processing resources of the management controller is allocated to compute processing support of the host system processor, wherein the one or more dual modes comprise:
   a first dual mode in which priority is given to compute processing support of the host system processor relative to execution of management features of the management controller;
   a second dual mode in which approximately equal priority is given to processing support of the host system processor and execution of management features of the management controller; and
   a third dual mode in which priority is given to execution of management features of the management controller relative to compute processing support of the host system processor.

5. The information handling system of claim 1, wherein the management controller is further configured to allocate hardware processing resources of the management controller to provide compute processing support for a second host system processor of a second information handling system communicatively coupled to the information handling system via at least one of the data network and the management network.

6. The information handling system of claim 1, wherein the management controller is further configured to:
   in response to an interrupt received from the host system processor, retrieve from the shared memory a command and any data associated with the command stored to the shared memory by the host system processor; and
   execute the command using hardware resources of the management controller.

7. The information handling system of claim 6, wherein the management controller is further configured to:
   store processed data resulting from execution of the command to the shared memory; and
   communicate an interrupt to the host system processor to indicate to the host system processor that the processed data is to be retrieved by the host system processor from the shared memory.

8. A method comprising:
   in an information handling system comprising a host system having a host system processor a management controller communicatively coupled to the host system processor, and a shared memory communicatively coupled to both the host system processor and the management controller, wherein the management controller is configured to provide management of the information handling system via management traffic communicated between the management controller and a management network external to the information handling system and isolated from a data network coupled to the information handling system when the host system is in a powered-on state and also when the host system is in a powered-off state, allocating hardware processing resources of the management controller to provide compute processing support for the host system processor, such that data associated with the compute processing is stored in the shared memory and is operated on by both the host system processor and the hardware processing resources of the management controller.

9. The method of claim 8, further comprising operating in a plurality of compute processing support modes, wherein each mode defines a priority of allocation of the hardware processing resources of the management controller between compute processing support for the host system processor and execution of management features of the management controller.

10. The method of claim 9, wherein the plurality of compute processing support modes includes at least two of the following modes:
   a full server management mode in which all hardware processing resources of the management controller are allocated to execution of management features of the management controller;
   a dual mode in which a first portion of hardware processing resources of the management controller are allocated to execution of management features of the management controller and a second portion of hardware processing resources of the management controller are allocated to compute processing support of the host system processor; and
   a full compute support mode in which all hardware processing resources of the management controller are allocated to compute processing support of the host system processor.

11. The method of claim 9, wherein the plurality of compute processing support modes includes one or more dual modes in which a first portion of hardware processing resources of the management controller is allocated to execution of management features of the management controller and a second portion of hardware processing resources of the management controller is allocated to compute processing support of the host system processor, wherein the one or more dual modes comprise:
   a first dual mode in which priority is given to compute processing support of the host system processor relative to execution of management features of the management controller;
   a second dual mode in which approximately equal priority is given to processing support of the host system processor and execution of management features of the management controller; and
   a third dual mode in which priority is given to execution of management features of the management controller relative to compute processing support of the host system processor.

12. The method of claim 8, further comprising allocating hardware processing resources of the management controller to provide compute processing support for a second host system processor of a second information handling system communicatively coupled to the information handling system via at least one of the data network and the management network.

13. The method of claim 8, further comprising:
   in response to an interrupt received from the host system processor, retrieving from the shared memory a command and any data associated with the command stored to the shared memory by the host system processor; and
   executing the command using hardware resources of the management controller.

14. The method of claim 13, further comprising:
   storing processed data resulting from execution of the command to the shared memory; and communicating an interrupt to the host system processor to indicate to the host system processor that the processed data is to be retrieved by the host system processor from the shared memory.

15. A management controller configured to be disposed in an information handling system and communicatively coupled to a host system processor of a host system of the information handling system, wherein the information handling system includes a shared memory communicatively coupled to both the host system processor and the management controller, and wherein the management controller is further configured to:
provide management of the information handling system via management traffic communicated between the management controller and a network external to the information handling system and isolated from a data network coupled to the information handling system when the host system is in a powered-on state and also when the host system is in a powered-off state; and
allocate hardware processing resources of the management controller to provide compute processing support for the host system processor, such that data associated with the compute processing is stored in the shared memory and is configured to be operated on by both the host system processor and the hardware processing resources of the management controller.

16. The management controller of claim 15, wherein the management controller is further configured to operate in a plurality of compute processing support modes, wherein each mode defines a priority of allocation of the hardware processing resources of the management controller between compute processing support for the host system processor and execution of management features of the management controller.

17. The management controller of claim 16, wherein the plurality of compute processing support modes includes at least two of the following modes:
a full server management mode in which all hardware processing resources of the management controller are allocated to execution of management features of the management controller;
a dual mode in which a first portion of hardware processing resources of the management controller is allocated to execution of management features of the management controller and a second portion of hardware processing resources of the management controller is allocated to compute processing support of the host system processor; and
a full compute support mode in which all hardware processing resources of the management controller are allocated to compute processing support of the host system processor.

18. The management controller of claim 16, wherein the plurality of compute processing support modes includes one or more dual modes in which a first portion of hardware processing resources of the management controller is allocated to execution of management features of the management controller and a second portion of hardware processing resources of the management controller is allocated to compute processing support of the host system processor, wherein the one or more dual modes comprise:
a first dual mode in which priority is given to compute processing support of the host system processor relative to execution of management features of the management controller;
a second dual mode in which approximately equal priority is given to processing support of the host system processor and execution of management features of the management controller; and
a third dual mode in which priority is given to execution of management features of the management controller relative to compute processing support of the host system processor.

19. The management controller of claim 15, wherein the management controller is further configured to allocate hardware processing resources of the management controller to provide compute processing support for a second host system processor of a second information handling system communicatively coupled to the information handling system via at least one of the data network and the management network.

20. The management controller of claim 15, wherein the management controller is further configured to:
in response to an interrupt received from the host system processor, retrieve from the shared memory a command and any data associated with the command stored to the shared memory by the host system processor; and
execute the command using hardware resources of the management controller.

21. The management controller of claim 20, wherein the management controller is further configured to:
store processed data resulting from execution of the command to the shared memory; and
communicate an interrupt to the host system processor to indicate to the host system processor that the processed data is to be retrieved by the host system processor from the shared memory.

* * * * *